US012761122B2

(12) United States Patent
Pollitt et al.

(10) Patent No.: US 12,761,122 B2
(45) Date of Patent: Oct. 13, 2026

(54) WEARABLE AIR POLLUTANT MONITORING DEVICE

(71) Applicant: YALE UNIVERSITY, New Haven, CT (US)

(72) Inventors: Krystal Pollitt, Toronto (CA); Elizabeth Lin, New Haven, CT (US); Jeremy Koelmel, New Haven, CT (US)

(73) Assignee: Yale University, New Haven, CT (US)

( * ) Notice: Subject to any disclaimer, the term of this patent is extended or adjusted under 35 U.S.C. 154(b) by 448 days.

(21) Appl. No.: 18/044,076

(22) PCT Filed: Sep. 3, 2021

(86) PCT No.: PCT/US2021/049032
§ 371 (c)(1),
(2) Date: Mar. 3, 2023

(87) PCT Pub. No.: WO2022/051604
PCT Pub. Date: Mar. 10, 2022

(65) Prior Publication Data

US 2023/0393030 A1 Dec. 7, 2023

Related U.S. Application Data

(60) Provisional application No. 63/074,705, filed on Sep. 4, 2020.

(51) Int. Cl.
*G01N 1/22* (2006.01)
*G01N 1/18* (2006.01)
*G01N 1/40* (2006.01)

(52) U.S. Cl.
CPC ............ *G01N 1/2214* (2013.01); *G01N 1/18* (2013.01); *G01N 2001/2276* (2013.01); *G01N 2001/4061* (2013.01)

(58) Field of Classification Search
CPC .................. G01N 1/2214; G01N 1/18; G01N 2001/2276; G01N 2001/4061; G01N 1/2273; B01D 53/02; G08B 21/14
(Continued)

(56) References Cited

U.S. PATENT DOCUMENTS 5,168,068 A * 12/1992 Yanagisawa ......... G01N 1/2273 436/167
5,302,191 A 4/1994 Koutrakis
(Continued)

FOREIGN PATENT DOCUMENTS

EP 0042683 A1 * 12/1981
JP 2008519256 A * 6/2008
(Continued)

OTHER PUBLICATIONS

Anderson Kim A. et al., "Preparation and Performance Features of Wristband Samplers and Considerations for Chemical Exposure Assessment," Journal of Exposure Science and Environmental Epidemiology (2017) 27, 551-559.
(Continued)

*Primary Examiner* — Robert R Raevis

(74) *Attorney, Agent, or Firm* — Saul Ewing LLP; Domingos Silva; Chihao Wang

(57) ABSTRACT

Wearable pollutant monitoring devices, associated methods of manufacture, and methods for pollution analysis are described herein. The device can concentrate airborne pollutants onto a substrate which can subsequently be analyzed
(Continued)

for a broad range of compounds using mass spectrometry (MS) (with or without chromatography), spectroscopy, nuclear magnetic resonance, electronic detectors, or other analytical platforms and biological/environmental assays.

7 Claims, 11 Drawing Sheets

(58) Field of Classification Search
USPC ......... 73/19.12, 23.22, 23.39, 31.07, 863.21, 73/864.21, 864.81; 96/108, 117.5, 148, 96/149, 154, 413–416; 95/88, 90, 95/116–147; 422/69
See application file for complete search history.

(56) References Cited

U.S. PATENT DOCUMENTS 5,551,278 A * 9/1996 Rounbehler ........... G01V 9/007 96/101
2008/0315083 A1* 12/2008 Lubda ................ G01N 30/7266 422/69
2009/0289010 A1 11/2009 Feliers
2014/0260974 A1 9/2014 Almirall
2016/0096136 A1 4/2016 Su
2017/0084439 A1 3/2017 Brown
2017/0303822 A1* 10/2017 Allsworth .......... B01D 46/0028
2018/0088092 A1 3/2018 Knight
2018/0202902 A1 7/2018 Hoffarth
2018/0214816 A1 8/2018 Greenbank
2018/0217030 A1 8/2018 Kendall
2020/0135444 A1 4/2020 Musselman

FOREIGN PATENT DOCUMENTS

KR 100355595 B1 * 10/2002
WO WO-2016159863 A1 * 10/2016
WO WO-2017210536 A1 * 12/2017 ............ B01D 11/00

OTHER PUBLICATIONS

Arif Ahmed A. et al., "Association between personal exposure to volatile organic compounds and asthma among US adult population," Int Arch Occup Environ Health (2007) 80: 711-719 DOI 10.1007/s00420-007-0183-2.
Baltussen et al., "Stir bar sorptive extraction as a sample preparation technique for chromatographic analysis: An overview," Asian Journal of Nanoscience and Materials, 2018, 1 (2), 54-60.
Bartkow, Michael E., et al. "Characterizing uptake kinetics of PAHs from the air using polyethylene-based passive air samplers of multiple surface area-to-volume ratios." Environmental Science & Technology 38.9 (2004): 2701-2706.
Bergmann, Alan J., et al. "Multi-class chemical exposure in rural Peru using silicone wristbands." Journal of Exposure Science & Environmental Epidemiology 27.6 (2017): 560-568.
Calafat, Antonia M. et al., "What additional factors beyond state-of-the-art analytical methods are needed for optimal generation and interpretation of biomonitoring data?." Environmental health perspectives 117.10 (2009): 1481-1485.
Ceballos, Diana, et al. "Characterization of solid-phase microextraction and gas chromatography for the analysis of gasoline tracers in different microenvironments." Journal of the Air & Waste Management Association 57.3 (2007): 355-365.
Delgado-Saborit, Juana M. et al. "Model development and validation of personal exposure to volatile organic compound concentrations." Environmental Health Perspectives 117.10 (2009): 1571-1579.
Delgado-Saborit, Juana M. et al. "Analysis of atmospheric concentrations of quinones and polycyclic aromatic hydrocarbons in vapour and particulate phases." Atmospheric Environment 77 (2013): 974-982.
Desmet, Koen, et al. "Profiling the spatial concentration of allethrin and piperonyl butoxide using passive sorptive sampling and thermal desorption capillary GC—MS." Chemosphere 71.11 (2008): 2193-2198.
Dixon, Holly M., et al. "Silicone wristbands compared with traditional polycyclic aromatic hydrocarbon exposure assessment methods." Analytical and bioanalytical chemistry 410 (2018): 3059-3071.
Donaire-Gonzalez, David, et al. "Personal assessment of the external exposome during pregnancy and childhood in Europe." Environmental Research 174 (2019): 95-104.
Donald, Carey E., et al. "Silicone wristbands detect individuals' pesticide exposures in West Africa." Royal Society Open Science 3.8 (2016): 160433.
Gendron, Louis, et al. "Evaluation of filters for the sampling and quantification of RNA phage aerosols." Aerosol Science and Technology 44.10 (2010): 893-901.
Hammel, Stephanie C., et al. "Measuring personal exposure to organophosphate flame retardants using silicone wristbands and hand wipes." Environmental science & technology 50.8 (2016): 4483-4491.
Huang, Sheng-Hsiu, et al. "Experimental characterization of aerosol suspension in a rotating drum." Aerosol and Air Quality Research 19.4 (2019): 688-697.
Jo, Sang-Hee, et al., "The combined effects of sampling parameters on the sorbent tube sampling of phthalates in air." Scientific Reports 7.1 (2017): 45677.
Kile, Molly L., et al. "Using silicone wristbands to evaluate preschool children's exposure to flame retardants." Environmental research 147 (2016): 365-372.
Koziel, Jacek A., et al., "Air sampling and analysis of volatile organic compounds with solid phase microextraction." Journal of the Air & Waste Management Association 51.2 (2001): 173-184.
Kumar, Anuj, et al., "Volatile organic compounds: sampling methods and their worldwide profile in ambient air." Environmental monitoring and assessment 131 (2007): 301-321.
Titcombe Lee, Mari, et al., "Partitioning of viruses in wastewater systems and potential for aerosolization." Environmental science & technology letters 3.5 (2016): 210-215.
Magnusson, Roger, et al. "Field evaluation and calibration of a small axial passive air sampler for gaseous and particle bound polycyclic aromatic hydrocarbons (PAHs) and oxygenated PAHs." Environmental Pollution 216 (2016): 235-244.
Maikawa, Caitlin L., et al. "Particulate oxidative burden as a predictor of exhaled nitric oxide in children with asthma." Environmental Health Perspectives 124.10 (2016): 1616-1622.
Martos, Perry A., et al., "Estimation of air/coating distribution coefficients for solid phase microextraction using retention indexes from linear temperature-programmed capillary gas chromatography. Application to the sampling and analysis of total petroleum hydrocarbons in air." Analytical chemistry 69.3 (1997): 402-408.
Masey, Nicola, et al. "Influence of wind-speed on short-duration NO2 measurements using Palmes and Ogawa passive diffusion samplers." Atmospheric Environment 160 (2017): 70-76.
Namieśnik, Jacek, et al. "Passive sampling and/or extraction techniques in environmental analysis: a review." Analytical and bioanalytical chemistry 381 (2005): 279-301.
O'Connell, Steven G., et al., "Silicone wristbands as personal passive samplers." Environmental science & technology 48.6 (2014): 3327-3335.
O'Connell, Steven G., et al. "In vivo contaminant partitioning to silicone implants: Implications for use in biomonitoring and body burden." Environment international 85 (2015): 182-188.
Okeme, Joseph O., et al. "Passive air sampling of flame retardants and plasticizers in Canadian homes using PDMS, XAD-coated PDMS and PUF samplers." Environmental pollution 239 (2018): 109-117.
Paschke, Heidrun, et al., "New passive samplers for chlorinated semivolatile organic pollutants in ambient air." Chemosphere 58.7 (2005): 855-863.
Paulik, L. Blair, et al. "Environmental and individual PAH exposures near rural natural gas extraction." Environmental pollution 241 (2018): 397-405.

(56) References Cited

OTHER PUBLICATIONS

Pawliszyn, Janusz. "2000 Maxxam Award Lecture Unified theory of extraction." Canadian Journal of Chemistry 79.10 (2001): 1403-1414.
Poole, Colin, et al. "Extraction for analytical scale sample preparation (IUPAC Technical Report)." Pure and applied chemistry 88.7 (2016): 649-687.
Rohlman, Diana, et al. "A case study describing a community-engaged approach for evaluating polycyclic aromatic hydrocarbon exposure in a Native American community." International journal of environmental research and public health 16.3 (2019): 327.
Schäfer, Ralf Bernhard, et al. "Using silicone passive samplers to detect polycyclic aromatic hydrocarbons from wildfires in streams and potential acute effects for invertebrate communities." Water research 44.15 (2010): 4590-4600.
Seethapathy, Suresh, et al., "Applications of polydimethylsiloxane in analytical chemistry: A review." Analytica chimica acta 750 (2012): 48-62.
Sheu, Roger, et al. "Advances in offline approaches for chemically speciated measurements of trace gas-phase organic compounds via adsorbent tubes in an integrated sampling-to-analysis system." Journal of Chromatography A 1575 (2018) 25 pages.
Tang, Y. S., et al., "Development and types of passive samplers for monitoring atmospheric NO2 and NH3 concentrations." The Scientific World Journal 1.2 (2001): 513-529.
Tienpont, Bart, et al. "Stir bar sorptive extraction—thermal desorption—capillary GC—MS applied to biological fluids." Analytical and Bioanalytical Chemistry 373 (2002): 46-55.
Turgeon, Nathalie, et al. "Comparison of five bacteriophages as models for viral aerosol studies." Applied and environmental microbiology 80.14 (2014): 4242-4250.
United States Environmental Protection Agency, "Definition and Procedure for the Determination of the Method Detection Limit, Revision 2," Dec. 2016, 8 pages.
Vineis, Paolo, et al. "The exposome in practice: design of the EXPOsOMICS project." International journal of hygiene and environmental health 220.2 (2017): 142-151.
Woo, Myung-Heui, et al. "Method for contamination of filtering facepiece respirators by deposition of MS2 viral aerosols." Journal of aerosol science 41.10 (2010): 944-952.
Yu, Chang Ho, et al., "Passive dosimeters for nitrogen dioxide in personal/indoor air sampling: a review." Journal of exposure science & environmental epidemiology 18.5 (2008): 441-451.
Zabiegała, Bożena, et al. "Passive sampling as a tool for obtaining reliable analytical information in environmental quality monitoring." Analytical and bioanalytical chemistry 396 (2010): 273-296.

* cited by examiner

WEARABLE AIR POLLUTANT MONITORING DEVICE

CROSS-REFERENCE TO RELATED APPLICATIONS

The present application is a 35 U.S.C. § 371 national phase application from, and claims priority to, PCT International Patent Application No. PCT/US2021/049032, filed Sep. 3, 2021, which claims priority under 35 U.S.C. § 119(e) to U.S. Provisional Application No. 63/074,705, filed Sep. 4, 2020, both of which applications are incorporated by reference herein in their entireties.

BACKGROUND OF THE INVENTION

Characterization of cumulative exposure to air pollutant mixtures using traditional measurement techniques is challenging in view of concerns about the weight, limited battery life, and cost of monitoring devices. Current personal air pollutant monitoring systems include backpacks containing hand-held air monitors, filters/pumps, and the like. The size, weight, and cost of these air sampling systems prevents use with vulnerable populations such as pregnant women and infants.

There has been limited development of analytical techniques to capture the cumulative exposure of individuals at critical windows of susceptibility to air pollutant mixtures. While low cost passive samplers are used, their current form factor allows for direct exposure to both the environment and a wearer's skin, meaning these passive samplers fail to be a good proxy of contaminant inhalation routes. In addition, conventional passive samplers are traditionally focused on anthropogenic exposures, and data-processing is often not automated.

Alternative exposure assessment approaches are necessary to study longitudinal, individual, and/or large cohort environmental exposures. The present invention addresses these needs.

SUMMARY OF THE INVENTION

Wearable pollutant monitoring devices and associated methods are described herein. In one aspect, a device for capturing chemical and biological compounds can include at least one sorbent bar including a glass tube having a predefined length and a predefined diameter, and a sorbent material coating at least a portion of a surface of the glass tube; and a housing chamber defining an inner cavity, where the at least one sorbent bar is positioned within the housing chamber.

This aspect can include a variety of embodiments. In one embodiment, an inner diameter of the glass tube defines an inner cavity running the predefined length of the glass tube, where the device further includes a metallic wire having a length greater than the length of the glass tube and a diameter smaller than the inner diameter of the glass tube, where the metallic wire is positioned within the inner cavity of the glass tube such that a first end and a second end of the metallic wire are positioned external to the inner cavity of the glass tube, and where the first end and the second end of the metallic wire are coupled to an inner surface of the housing chamber via a magnet, thereby positioning the sorbent bar within the housing chamber.

In another embodiment, a surface of the housing chamber further defines one or more apertures. In some cases, the device can further include one or more filter layers positioned within the one or more apertures.

In another embodiment, the device can further include a wearable defining a chamber cavity, depression, or surface for positioning the housing chamber. In some cases, the wearable can further include a strap or clip.

In another embodiment, the device can further include at least one other sorbent bar positioned within the housing chamber.

In another aspect, a method of manufacturing a device for capturing chemical or biological compounds can include soaking a section of elastomeric tubing in a chlorinated solvent solution, where the elastomeric tubing defines an inner cavity along a length of the tubing; inserting a glass rod into the inner cavity of the elastomeric tubing to form a sorbent bar; washing the sorbent bar in a solvent comprising hexane, methanol, ethyl acetate, or a combination thereof; and heating the sorbent bar under a nitrogen flow.

This aspect can include a variety of embodiments. In one embodiment, the chlorinated solvent solution includes dichloromethane and methanol.

In another embodiment, the elastomeric tubing includes polydimethylsiloxane (PDMS).

In another embodiment, soaking the section of elastomeric tubing in the chlorinated solvent solution causes the elastomeric tubing to swell.

In another embodiment, heating the sorbent bar occurs at 300° C.

In another embodiment, the nitrogen flow is composed of 99.99% nitrogen.

In another aspect, a method of extracting sorbed compounds by a sorbent bar includes removing the sorbent bar from the housing chamber; and exposing the sorbent bar to a thermal desorption process, which can include: inserting the sorbent bar into an autosampler tube; and heating the autosampler tube to 280° C. under a helium gas flow.

In another aspect, a method of analyzing sorbed chemical and/or biological compounds captured by a sorbent bar for evaluating a user's exposure to the chemical and/or biological compounds, can include inputting the sample extracted from the sorbent bar into a mass spectrometer; receiving sample data from the mass spectrometer; deconvoluting the sample data received from the mass spectrometer according to a deconvolution technique;

identifying mass spectral data from the deconvoluted sample data; and determining characteristics of one or more molecules captured by the sorbent bar and from the mass spectral data.

This aspect can include a variety of embodiments. In one embodiment, the method can further include chemically separating the extracted sample by gas chromatography prior to inputting into the mass spectrometer.

In another embodiment, the method can further include chemically separating the extracted sample by liquid chromatography prior to inputting into the mass spectrometer.

In another embodiment, the extracted sample is directly injected into the mass spectrometer without chemical separation.

In another embodiment, the method can further include filtering the sample data according to a retention index, a reverse search index, a percentage of fragment masses scheme, or a combination thereof.

In another embodiment, the method can further include filtering the sample data according to a blank feature filtering scheme, a duplicate removal scheme, an average score threshold filtering scheme, a total ion chromatogram (TIC) recalculation scheme, or a combination thereof.

In another embodiment, the method can further include performing an iterative exclusion tandem mass spectrometry process on the extracted sample and at least one other sample extracted from the sorbent bar.

In another embodiment, determining characteristics for the one or more molecules can further include identifying one or more compounds from one or more mass spectral features; and determining a set of attributes from the one or more mass spectral features. In some cases, the set of attributes can include a toxicity level, a half-life value in living organisms, a bioaccumulation level, an environmental exposure level, environmental fate and transport, partitioning in media, transformation rates and products, source information, or a combination thereof.

BRIEF DESCRIPTION OF THE DRAWINGS

For a more complete understanding of the nature and desired objects of the present invention, reference is made to the following detailed description taken in conjunction with the accompanying drawing figures wherein like reference characters denote corresponding parts throughout the several views.

DEFINITIONS

Figure 1:
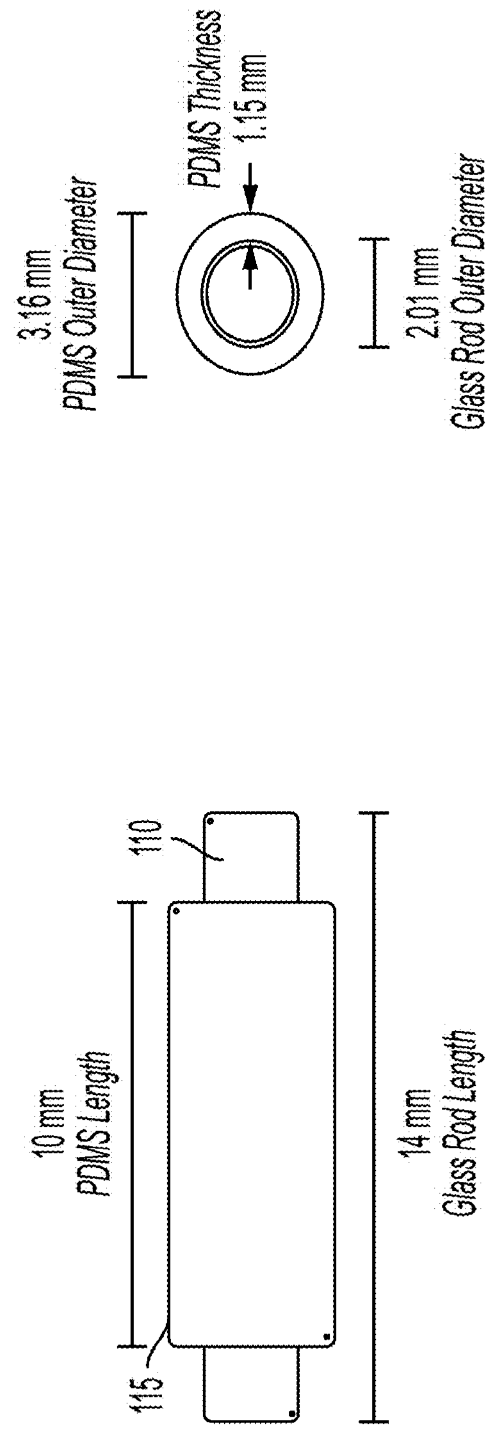
FIG. 1 depicts side and cross-sectional views of a sorbent bar according to embodiments of the present disclosure.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10 or less of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Wearable Pollutant Monitoring Device

Wearable pollutant monitoring devices, associated methods of manufacture, and methods for pollution analysis are described herein. The device can concentrate airborne chemicals onto a substrate, which can subsequently be analyzed for a broad range of compounds using mass spectrometry (MS) (with or without chromatography), spectroscopy, nuclear magnetic resonance, electronic detectors, or other analytical platforms and biological/environmental assays. Longitudinal exposure assessment in vulnerable populations can be facilitated by the lightweight, wearable form factor of the device. The low cost of this sampling technique can further enable deployment across large populations, increasing the quantity of environmental data available for evaluating environmental risk factors for disease. In some cases, the device can include a polydimethylsiloxane (PDMS) sorptive extraction technique to passively concentrate non-polar airborne compounds. Glass rods can be coated with a thin PDMS film and mounted into a polytetrafluoroethylene (PTFE) chamber fit into a wristband or a clip. The wristband/clip can be worn by an individual for several hours to days depending on ambient levels.

To cover thousands of analytes in a single acquisition, sample analysis can be performed via thermal desorption gas chromatograph high resolution MS. Time-averaged personal exposure concentrations can be evaluated for a broad range of targeted semi-volatile organic compounds, including polycyclic aromatic hydrocarbons (PAHs), phthalates, polychlorinated biphenyl (PCBs), and polybrominated diphenyl ethers (PBDEs). Use of the high-resolution MS can further enable untargeted analysis and suspect screening of the samples to search for unknown pollutants and other airborne particles/compounds. Other important compounds as related to allergen sensitivity and forensics can be detected using the PDMS passive samplers, including lipids (which can be used for determining pathogenic bacteria, animals, and plant exposure to name a few), metabolites, mold spores, viruses, and illicit drugs. The pollutant analysis can also include removing background contamination, performing quality control, and associating compounds annotated with uses and potential sources.

Sorbent Bar

The wearable pollutant monitoring device can include a sorbent bar, such as the sorbent bar 105 of FIG. 1. The sorbent bar 105 can further include a glass rod 110, which can be composed of glass and can include predefined dimensions. For example, the glass rod 110 can include dimensions suited for placement in a housing chamber or worn by a wearer, such as 14 mm length and a 2-mm diameter. Further, the glass rod 110 can either be hollow (e.g., having an inner diameter) or solid. In some cases, the glass rod 110 can take other geometrical shapes, such as a rectangular bar, triangular bar, an elliptical bar, and the like.

Polysilicone Coating

The glass rod 110 can include a polysilicone coating 115 coating or positioned on at least a portion of an exterior surface of the glass rod 110. As shown in FIG. 1, in some cases the polysilicone coating 115 can include a length shorter than the glass rod 110 (e.g., 10 mm). The polysilicone coating 115 can be cured using an addition curing process, such as platinum curing, which can facilitate material consistency properties, such as tensile strength, elongation, tear strength, and the like.

The polysilicone coating 115 can capture analytes (e.g., via sorption) when exposed to ambient environments. For example, the polysilicone coating can capture volatile organic compounds (VOCs), such as polycyclic aromatic hydrocarbons (PAHs), phthalates, polychlorinated biphenyl (PCBs), and polybrominated diphenyl ethers (PBDEs). Other compounds that can be captured by the polysilicone coating 115 can include lipids, viruses, and drug compounds. In some cases, the polysilicone coating 115 can be composed of polydimethylsiloxane (PDMS) and the like. A thermally stable PDMS can enable automated thermal desorption of samples directly onto a gas chromatograph high resolution MS, thereby eliminating the need for any solvents.

Method of Manufacture for Sorbent Bar

A method of manufacturing the sorbent bar is described herein. A cured polysilicone tubing can be cut into predefined (e.g., 10 mm length) sections. Curing the tubing can increase the purity of the tubing, allow for lower extractable detection, and decrease the amount of siloxane bleeding. Decreased bleeding can permit the use of MS operation in a full-scan electron impact (EI) mode for performing untargeted contaminant analysis.

The sections of polysilicone tubing can be soaked in a methanol solution (e.g., dichloromethane/methanol at a 1:1 ratio) for a predefined period of time (e.g., 0.5 hours). The soaking can cause the polysilicone section to swell. A section (e.g., 14 mm length) of capillary tubing can be inserted through the section of swollen polysilicone tubing to form the sorbent bar.

The sorbent bars can be washed in a solvent such as hexane, methanol, ethyl acetate, and the like, and then air-dried with constant air flow for a predefined length of time (e.g., 2 hours) to remove residual solvent. The sorbent bars can then be baked at a predefined temperature (e.g., 300° C.) for a predefined length of time (e.g., 130 minutes) under a nitrogen flow (e.g., 0.1-0.3 L/min flow of 99.99% nitrogen) in a vacuum oven.

The sorbent bars can also be stored in pre-cleaned glass inserts inside 2 mL amber glass vials sealed with PTFE caps at room temperature until use. Glass micro-inserts can also be cleaned by baking at a predefined temperature for a predefined length of time (e.g., 300° C. for 130 minutes) under a nitrogen flow in a vacuum oven. Glass vials and caps can also be baked at predefined temperatures and periods of time (e.g., 60° C. for least 24 hours).

Sorbent Bar Conditioning

Laboratory glassware for manufacturing the pollutant monitoring device can be baked at a predefined temperature for a predefined length of time (e.g., 250° C. for 2 hours) under a flow of nitrogen. Further, manufacturing tools can be rinsed with a methanol solution prior to use. Cleaned glassware and tools can be stored in an oven prior to use. Glass micro-inserts for sorbent bar storage can also be pre-cleaned by baking under a flow of nitrogen gas.

Housing Chamber

Figure 2:
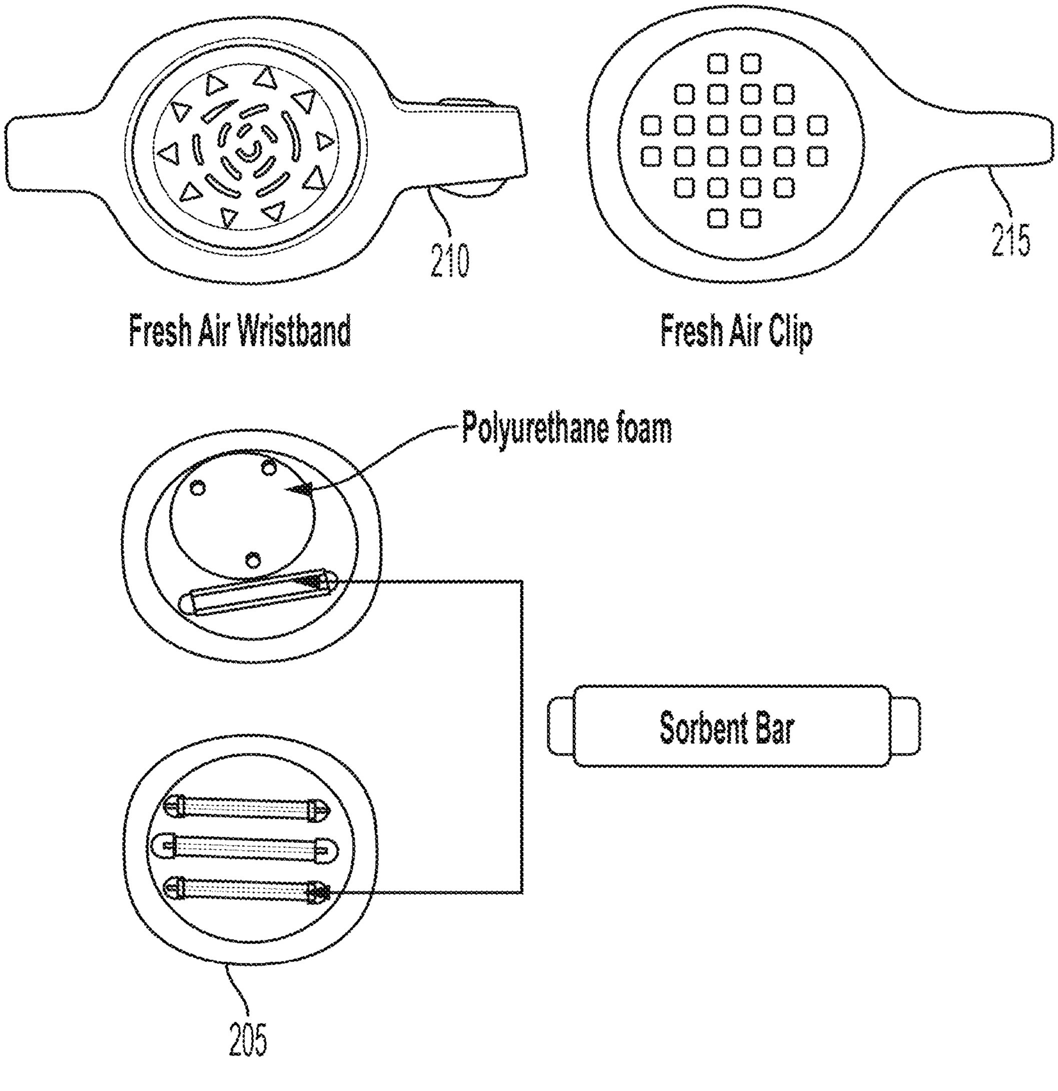
FIG. 2 depicts housing chambers and sorbent bars inserted into housing chambers according to embodiments of the present disclosure.

The wearable pollutant monitoring device can also include a housing chamber, such as housing chamber 205 of FIG. 2. The housing chamber 205 can include a bottom cover and a top cover. When coupled to each other, the bottom cover and top cover form an inner cavity. Further, the bottom cover, top cover, or both can define one or more perforations which can allow exposure for the sorbent bar to the ambient environment. In some cases, the perforations can be further covered with a filter for filtering large particles. One or more sorbent bars can be positioned within the inner cavity of the housing chamber 205. In some cases, the housing chamber can include tangs extending from an inner surface of the top or bottom cover for positioning a sorbent bar on. In other cases, a wire can be run through the hollow cavity of a sorbent bar and the ends of the wire can be coupled to an inner surface of the top or bottom cover. Housing the sorbent bar in a contained chamber can ensure there is no direct sorption of compounds directly from the wearer's skin, restricting sorption to airborne pollutants representative of the inhalation route of exposure. In addition, a filter can be included in the housing chamber to minimize particles from entering the housing chamber and absorption onto the sorbent bars.

Wristband Preparation

The sorbent bars can be housed in a housing chamber, which can be mounted in a wristband 210 or clip 215. In some cases, the housing chambers can be sized to accommodate multiple sorbent bars. These housing chambers can include a bottom and top plate that can be manufactured from PTFE Teflon. The face plates can include opening areas for air flow into the chamber. The bottom PTFE plate can include a stainless-steel disc (e.g., thickness: 0.2 mm; diameter: 22.6 mm) and covered with a PTFE sheet (e.g., 0.1 mm thickness; diameter: 23 mm). In preparation for deployment, PDMS sorbent bars can be loaded into the housing chamber (e.g., via stainless steel forceps). A PTFE coated stainless steel wire can be placed through the glass tube of the sorbent bar and mounted to the baseplate of the housing chamber (e.g., with neodymium magnets). Prior to deployment, all components of the housing chamber can be cleaned using solvents or a thermal process. Following deployment, the sorbent bars can be removed from the wristband housing chamber (e.g., via stainless steel forceps) and returned to glass micro-inserts in glass vials. The sorbent bars can be stored until analysis.

Analyte Extraction

Figure 8:
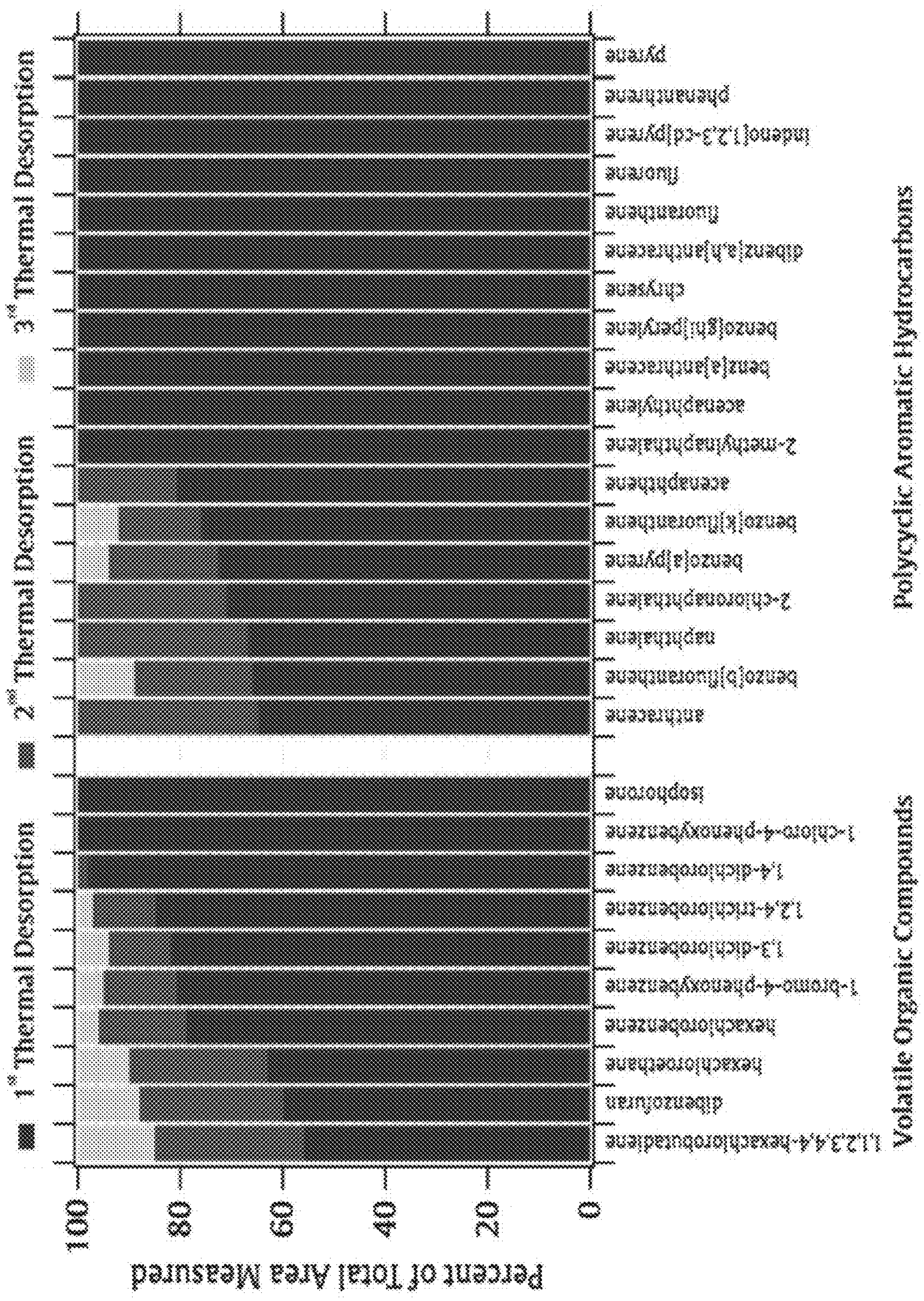
FIG. 8 depicts a graph of percent recovery of analytes following three consecutive thermal desorptions of a PDMS sorbent bar.

The sorbent bars can undergo an extraction procedure prior to analyte analysis. The extraction procedure can include either thermal desorption or solvent extraction. For example, thermal desorption can include placing sorbent bars into pre-cleaned glass autosampler tubes on a temperature controlled autosampler tray maintained. For sample analysis, an autosampler tube can then be thermally desorbed under a flow rate of helium gas (99.999%) (FIG. 8). For solvent or buffer extraction, the sorbent bar can be immersed in methanol, dichloromethane, hexane, toluene, and the like. The solvent can then be injected into a mass spectrometer. In some cases, analytes can be directly transferred to the mass spectrometer. Thermal desorption can provide higher analyte sensitivity compared to other extraction methods used for mass spectrometry. In some cases, surface debris can be removed from the sorbent bar (e.g., a water wash) prior to analyte extraction.

Analyte Analysis

Figure 3:
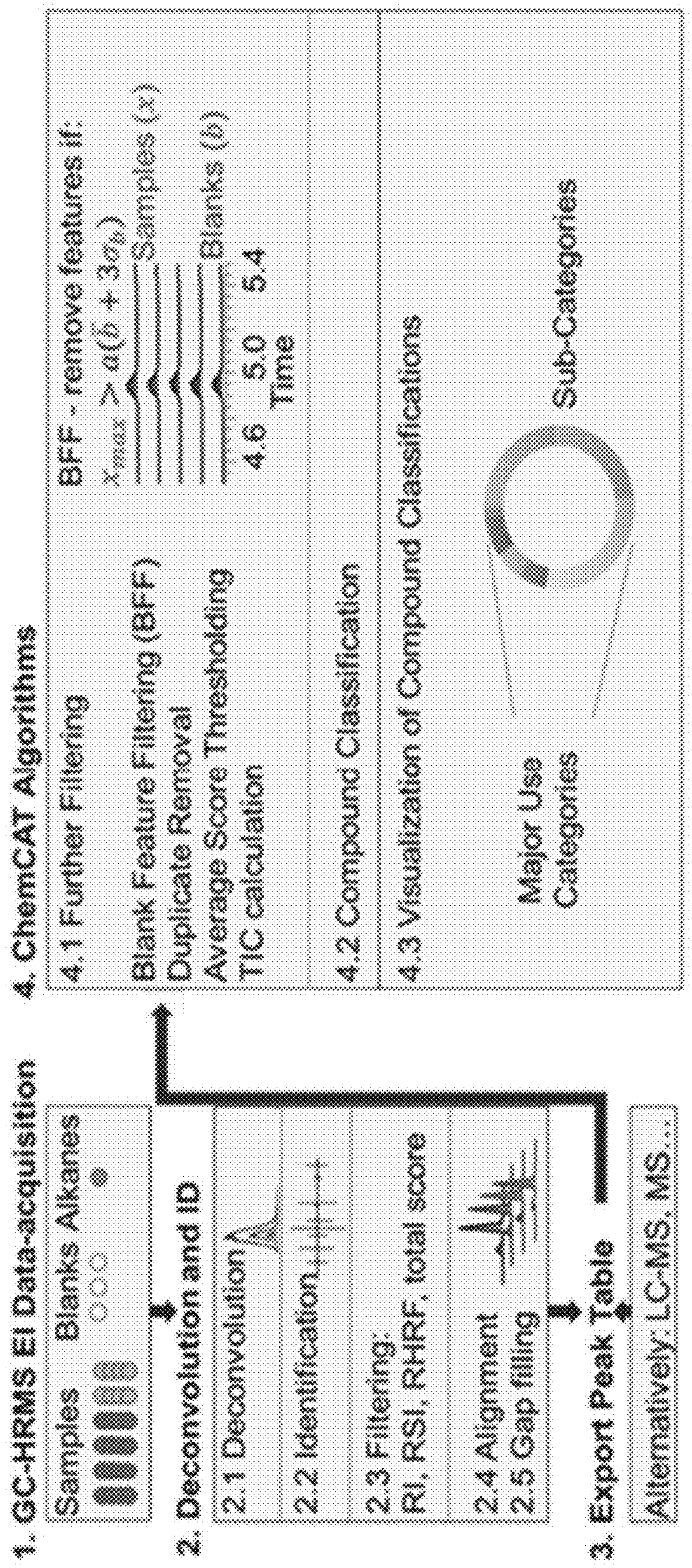
FIG. 3 depicts a workflow process for pollutant sampling processing captured by a wearable pollutant monitoring device according to an embodiment of the present disclosure.
Figure 4:
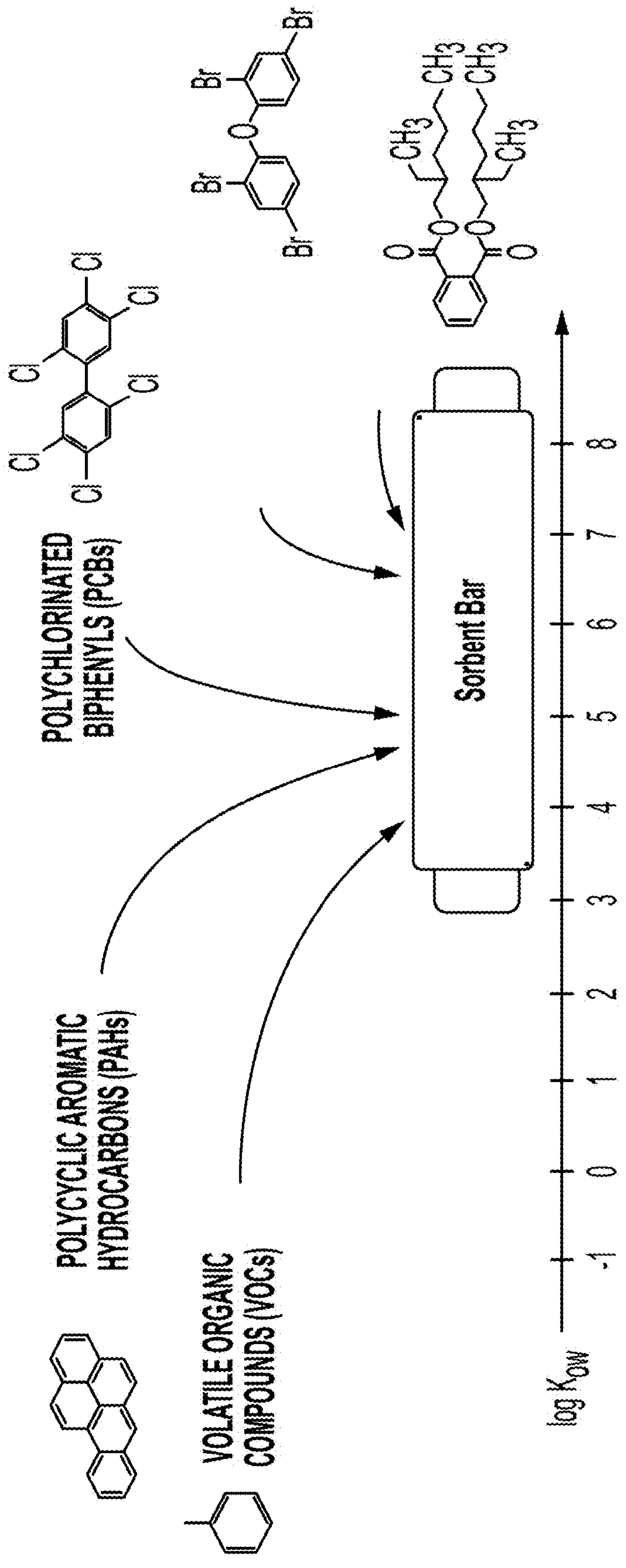
FIG. 4 depicts a graphical relationship between sorption properties of a sorbent bar and an octanol water partitioning coefficient ($K_{ow}$).
Figure 5:
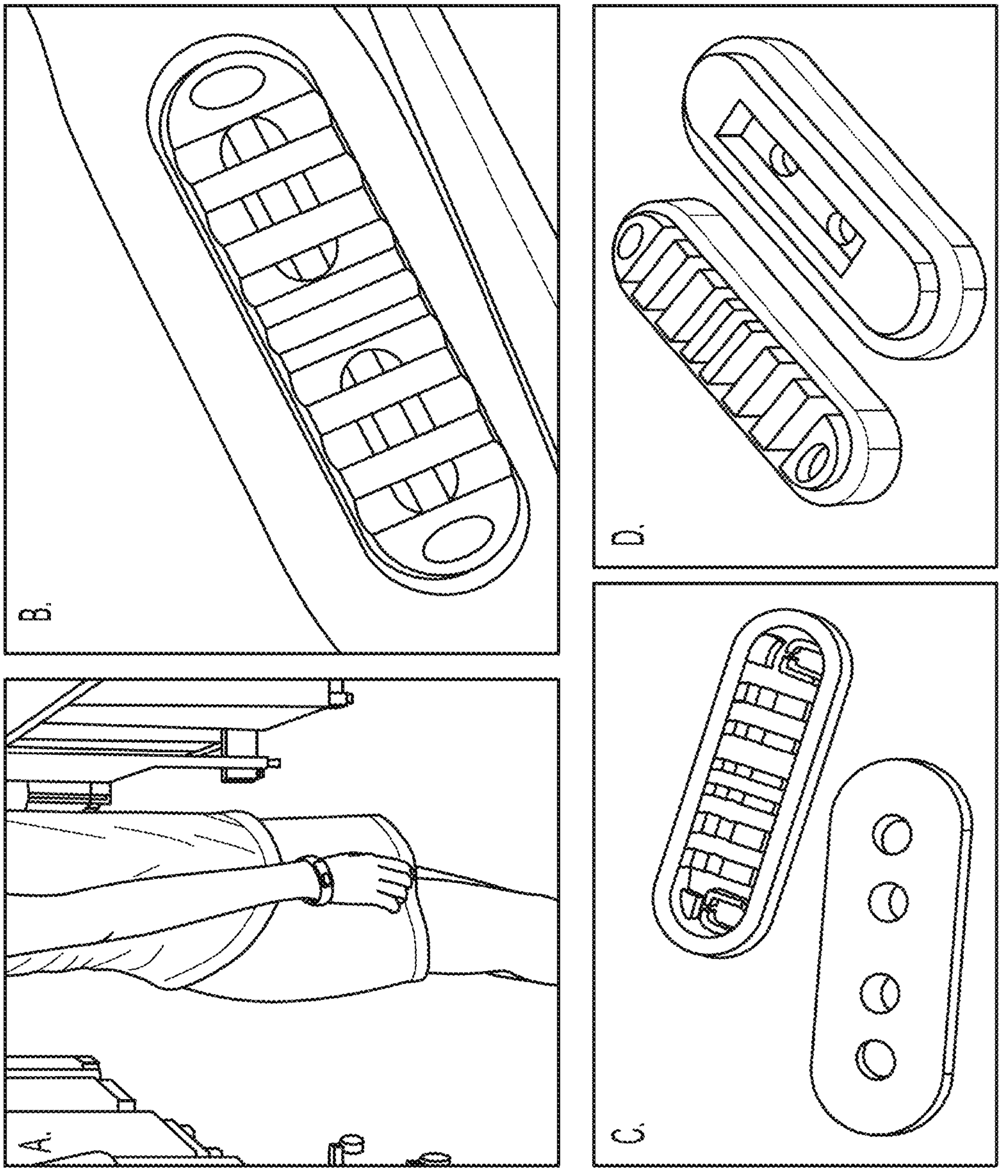
FIG. 5 depicts a wearable pollutant monitoring device for personal air pollutant exposure assessment according to embodiments of the present disclosure. Image (A) is an image of a wearer modelling the wearable device. Image (B) is an image of two sorbent bars mounted in the top compartment of the wristband for passive collection of air samples. Image (C) is an image of the inner platform for mounting the two sorbent bars used for air sampling. Image (D) is an image of the front and bottom panels designed to house sorbent bars. The bottom panel on the right holds a third sorbent bar to sample pollutants excreted via perspiration.
Figure 6:
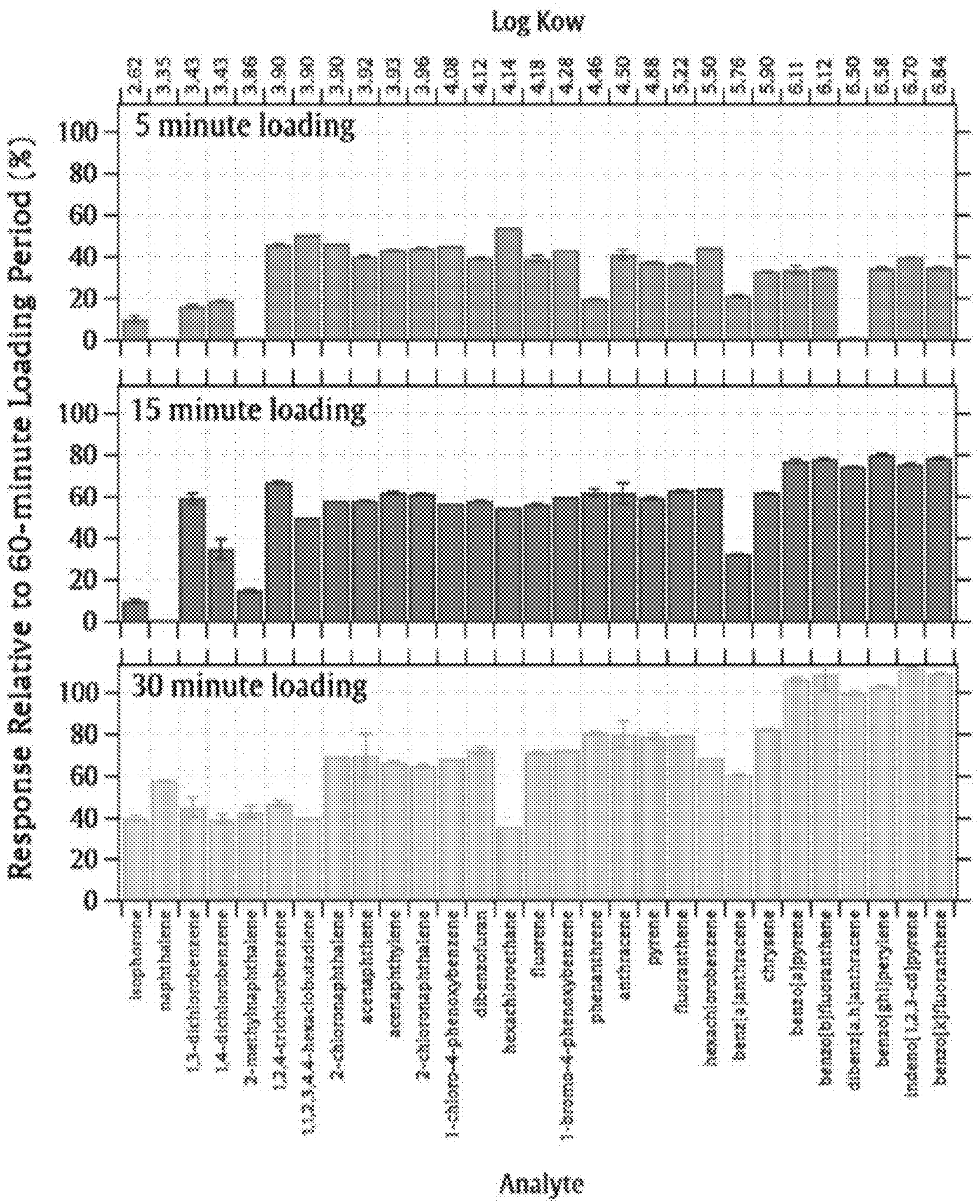
FIG. 6 depicts a graph of evaluating of the optimal exposure duration for water loading PDMS sorbent bars to calibrant standards. The mean response and the associated standard deviation is shown for three replicate runs.

The extracted analytes can be transferred into a mass spectrometry system. Mass spectrometry sample data can be analyzed using an automated workflow, which removes background contamination, performs quality control, and associates compounds annotated with uses, potential sources, and toxicity (e.g., as depicted in FIG. 3). Non-targeted peak detection, molecular networks, rule-based approaches, and machine learning can be performed to classify molecules by fragmentation spectra. Suspect screening can be conducted using a unique set of filtering parameters (e.g., retention index, reverse EI spectral matching, reverse high-resolution matching scores, and the like) to generate high confidence identifications. Software (e.g., ChemCAT) can link compounds to stored database information on estimated toxicity, bioaccumulation, and environmental exposure, fate, and transport of annotated compounds emission source and toxicity (EPA CPCat, CPDat, TEST, OPERA, and NHANES) using respective CAS numbers.

The software can automate the data-processing workflow for suspect screening. Blank filtering can be performed using blanks which are carried throughout the experimental protocol. Blank filtering can reduce background signal and noise which are from sources other than personal exposure. An example blank filtering scheme can be performed using the equation below:

$$S_Q > c\times(\overline{B}+(3\times B_\sigma))$$

In the above equation, $S_Q$ can be some percentile of samples. c can be a constant, $B_\sigma$ can be a blank standard deviation, and $\overline{B}$ can be a blank average.

Quality control can be performed using repeated injection of standards, labeled internal standards, and analyte signal across run order and batches to account for run order and batch effects. Annotated compounds can then be linked with use/source/toxicity information. In some cases, pollutant monitoring device can be positioned for stationary indoor and outdoor analysis to link personal exposures to source exposures. Non-negative matrix factorization, neural networks, correlation matrices, and other techniques can also be applied to classify common sources given a population with similar exposure profile sources or one client across multiple time points.

Further, in some cases, matrix assisted laser desorption high resolution tandem mass spectrometry (MALDI-HRMS/MS) can be implemented for direct analysis of lipids and other small metabolites from the pollution monitoring devices, and to liquid chromatography (LC) HRMS/MS for more in-depth coverage of the lipidome. Lipid profiles informatics can distinguish biological sources of exposures, including down to the functional level of microbes, characterizing certain plants exposures, and mammalian exposures.

For example, a total ion chromatogram (TIC) recalculation scheme can be performed on the analyte results. A TIC can be recalculated for the analyte profile from peak heights using a ratio of average TIC and average peak heights. For example, an equation for a TIC recalculation scheme ($x_{TIC}$) can include:

$$x_{TIC} = x_H \times \frac{\overline{x}_{TIC}}{\overline{x}_H}$$

In the above equation, $x_H$ can be a respective peak height $\overline{x}_{TIC}$ can be the average TIC, and $\overline{x}_H$ can be the average peak height.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. For example, it should be understood, that modifications in reaction and/or assay conditions, with art-recognized alternatives and using no more than routine experimentation, are within the scope of the present application.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, practice the claimed methods of the present invention. The following working examples therefore, specifically point out selected embodiments of the present invention, and are not to be construed as limiting in any way the remainder of the disclosure.

Example 1

Introduction

Organic air pollutants, such as volatile organic compounds (VOCs) and polycyclic aromatic hydrocarbons (PAHs), are released from various sources, including combustion activities (cooking, cigarette smoke, candles/incenses, heating) as well as evaporation from personal care, cleaning products, and building materials. Exposure has been associated with respiratory and cardiovascular disease as well as reproductive and neurobehavioral outcomes. Personal air pollutant monitoring systems traditionally include backpacks containing expensive hand-held air monitors and filters/pumps. Pollutants sampled onto filters are typically solvent extracted and analysed by gas chromatography mass spectrometry (GC-MS). This sample preparation approach is laborious, limiting the feasibility of evaluating personal exposure on a larger scale. Alternative assessment approaches are necessary to study longitudinal environmental exposures of vulnerable populations.

Passive sampling approaches have been used to measure ambient concentrations of VOCs, PAHs, phthalates, flame retardants and pesticides at stationary monitoring locations. This type of sampler operates without a pump and is comprised of a polymeric sorbent (i.e., polydimethylsiloxane, PDMS; activated carbon; divinylbenzene; carboxen; polyethylene) which acts an extraction phase for airborne organic pollutants. The rate of pollutant initially extracted from the air by the sorbent membrane is proportional to ambient concentrations (linear regime). As the sampling time is extended, uptake of air pollutants by the sorbent membrane continues until an equilibrium is reached with ambient concentrations (near equilibrium regime). Restricting sorbent membrane extraction to the linear regime enables a time-weighted average exposure concentration to be determined. The extraction selectivity as well as rate and capacity are determined by the volume and geometric configuration of the sorbent membrane as well as the agitation conditions of the sampler (i.e., boundary layer thickness).

Sorbent membranes have been incorporated into wearable form factors to facilitate personal exposure assessment. Badges/brooches and diffusion tubes worn on an individual's lapel have been deployed to evaluate VOC and SVOC exposure. Several studies have recently demonstrated the utility of commercially-available silicone wristbands (24hourwristband.com; wristbands.com) for sampling SVOCs. The feasibility of detecting an individual's environmental and occupational pollutant exposures using these silicone wristbands has been reported for various locations (U.S., Chile, Peru, Senegal) for multi-hour to multi-week exposure assessment periods. These wristbands have also been deployed with pre-school children to assess exposure concentrations of polybrominated diphenyl ethers and organophosphate flame retardants and adults to evaluate exposure to pesticide residues. Measured diphenyl ethers and organophosphate flame retardants and pesticides have been reported to be correlated with their respective biomarkers in serum, urine or hair. PAHs exposure across a cohort of pregnant women have further been positively correlated with PAH concentrations measured using traditional active sampling monitors as well as urinary levels of PAH metabolites.

While commercially-available silicone wristbands have emerged as an attractive exposure assessment tool for a range of organic exposures, it is important to acknowledge the multiple exposure routes captured by tool as well as challenges with the current wristband analysis approach. This wristband is comprised of a ~2.5 mm thick silicone sorbent membrane. As this sorbent membrane is in contact with the air and skin during the assessment period, the measured exposure represents a combination of ambient air and dermal sources. Application of lotions by individual to their hands/arms, may create a film on the wristband surface which may impact the uptake rate/capacity of environmental contaminants from other sources. Regarding analysis methods, current wristband protocols use a solvent extraction method. This manual procedure requires extended laboratory personnel time, limiting the feasibility of the silicone wristbands in larger study populations. Understanding the implications of the wristband design on exposure estimates as well as the feasibility of the analysis workflow are critical as the deployment of wearable passive samplers in epidemiology studies increases.

We present a novel wearable sampler, the Fresh Air wristband, to characterize personal air pollutant exposures (FIG. 2) This sampler was designed to exclusively evaluate contaminant exposure through inhalation and use a solvent-free extraction protocol with the aim of increasing analysis throughput. The Fresh Air wristband consisted of a polytetrafluoroethylene (PTFE) chamber that contained two passive sampling devices: a PDMS sorbent bar which absorbed airborne organic pollutants and a commercially-available Ogawa pad for sampling nitrogen dioxide ($NO_2$). The wristband was worn and then returned to the laboratory for analysis. Through these example, we: (1) demonstrate VOCs and PAHs uptake repeatability and rate by the PDMS sorbent bar, (2) evaluate the stability of absorbed compounds in the PDMS sorbent bar, and (3) demonstrate application of this Fresh Air wristband as a personal exposure assessment tool for $NO_2$ and airborne organic pollutants.

METHODS AND MATERIALS

PDMS Sorbent Bar and Fresh Air Wristband Preparation and Analysis

PDMS sorbent bars were analyzed by thermal desorption GC time-of-flight MS for VOC and PAHs. Ogawa pads were analyzed for $NO_2$ concentrations using a colorimetric procedure, following the manufacturer's protocols.

Sorbent Bar Sampling Evaluation

PDMS sorbent bars were infused with calibrant mixtures (375, 750 and 1500 pg). The repeatability of analyte uptake by the bars was evaluated across five replicates at each concentration. PDMS sorbent bars were also exposed to airborne pollutants to evaluate uptake repeatability. Three sorbent bars were placed into Fresh Air wristbands and five wristbands were mounted 0.5 m from a ventilated natural gas stove in a commercial kitchen for 24-hours. To explore the effect of handling conditions on analytes retention of absorbed in the PDMS matrix, temperature control experiments were conducted. Sorbent bars were water loaded with the internal standard mixture (1500 pg). Bars were stored either at 4° C. or 23° C. for 24 hours and then analyzed. Five replicates were run for each storage temperature.

Evaluation of the PDMS Sorbent Bar for Air Pollutant Sampling

To evaluate the PDMS sorbent bar as a passive sampler, the repeatability of air pollutant uptake was tested. The uptake rate of these compounds from ambient air was also assessed in addition to the ability of the PDMS sorbent bar to retain these air pollutants over an extended exposure assessment period.

Application of the Fresh Air Wristband as a Personal Exposure Assessment

The application of the Fresh Air wristband as a sampling device for personal exposure assessment was evaluated in a cohort of 36 children residing in Springfield, MA. Written assent/consent was provided by children and their guardians prior to participation. Participants, aged 12-13 years, wore the Fresh Air wristband for five consecutive days (Monday-Friday) and placed proximal to their bed overnight. A graphical questionnaire was used to assess the children's home environment as well as commute to/from school (route, mode, duration). A one-way ANOVA was used to evaluate differences in personal exposure concentrations between health, home and travel characteristics.

Results and Discussion

Laboratory Calibration of the PDMS Sorbent Bar for Quantifying VOCs and PAHs The feasibility of quantifying exposures was initially evaluated. PDMS sorbent bars were infused with a mixture containing known concentrations of VOCs and PAHs and used to prepare six-point calibration curves. Calibration curves were linear for all analytes ($R^2$ range: 0.982-1.000). Across five replicates at three concentrations (375, 750, 1500 pg), the lowest average coefficient of variation was found for acenaphthene (3.3%, range: 1.2-5.6%) and the highest was observed for chrysene (11.4%, range: 11.2-11.6%).

Field Evaluation of the Repeatability of Uptake by the PDMS Sorbent Bar

The repeatability of airborne VOCs and PAHs uptake by the PDMS sorbent bar was assessed in an industrial kitchen. All but six lower molecular weight compounds were detected. The average coefficient of variation across detected analytes was 4.1% (range: 0.2-10.3%).

Field Evaluation of Uptake Rate by the PDMS Sorbent Bar

Figure 9:
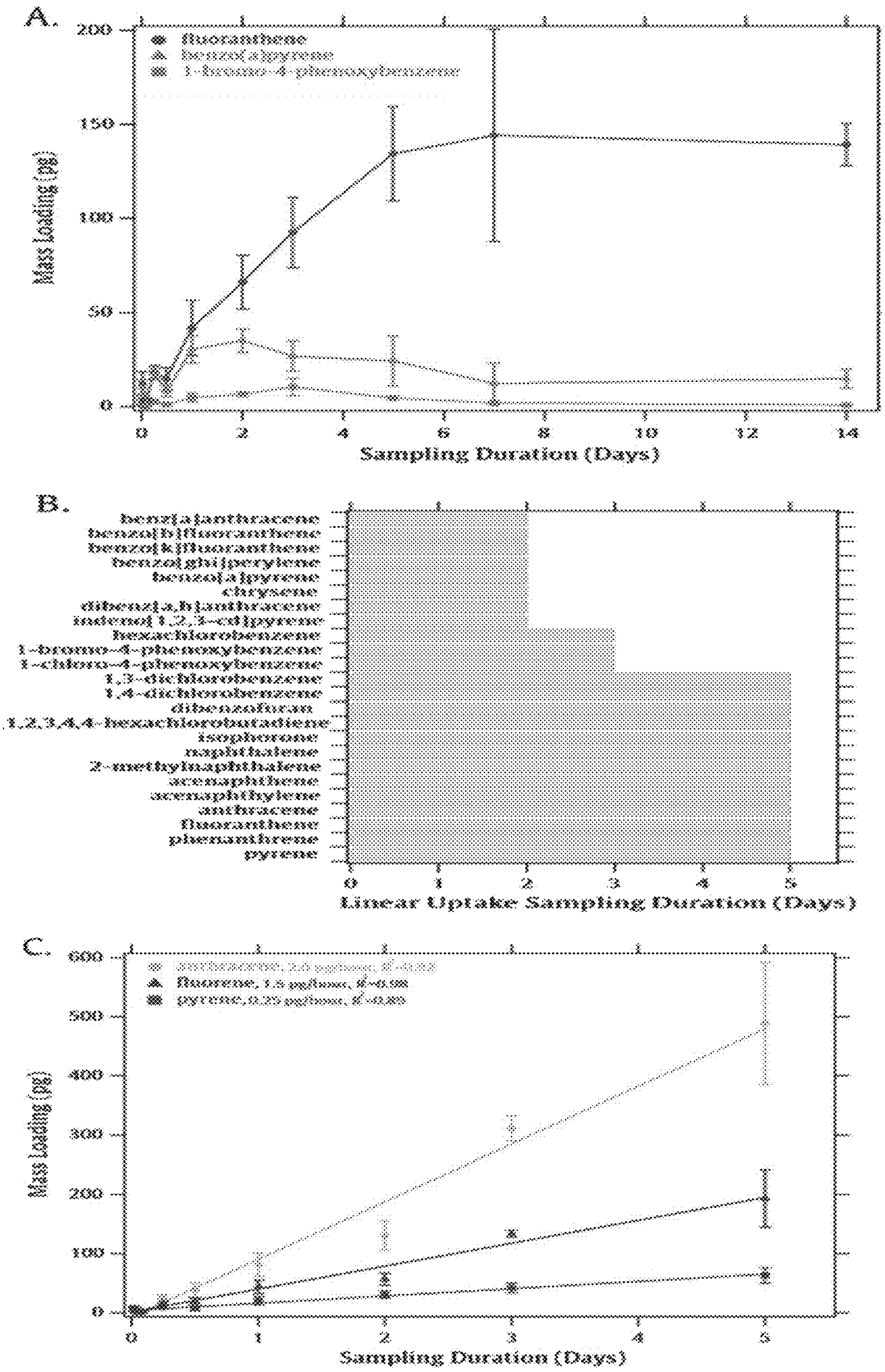
FIG. 9 depicts graphs of the PDMS sorbent bar uptake of VOCs and PAHs from an indoor environment for PAHs and VOCs. Image (A) is an image of the measured uptake (mean±standard deviation) of three compounds with variable times to reached equilibrium over the 14-day study period. Image (B) is an image of the length of the linear uptake regime for measured VOCs and PAHs. Image (C) is an image of the comparison of linear uptake rates for three prevalent PAHs.

PDMS sorbent bars were placed in Fresh Air wristbands and positioned at a stationary indoor sampling location with stable temperature (23° C.) and air movement (<0.025 m/s). Pollutant uptake was initially linear and continued until equilibrium was reached with ambient air concentrations. The length of time to attain equilibrium differed across compounds and is shown for three compounds in FIG. 9A. As the mass loading in this sampling regime is proportional to air concentrations and is useful in guide, it was of interest to determine the duration of linear uptake for each compound to guide the length of the exposure assessment period. The length of the linear regime ranged from <2 to 5 days for all measured VOCs and PAHs (FIG. 9B). The sampling rate of the PDMS sorbent bar was calculated as the slope in the linear uptake period. Uptake rates ranged from 0.01 to 4.06 pg/hour and are shown for three PAHs in FIG. 9C.

Laboratory Evaluation of Pollutant Stability on the PDMS Sorbent Bar

Figure 10:
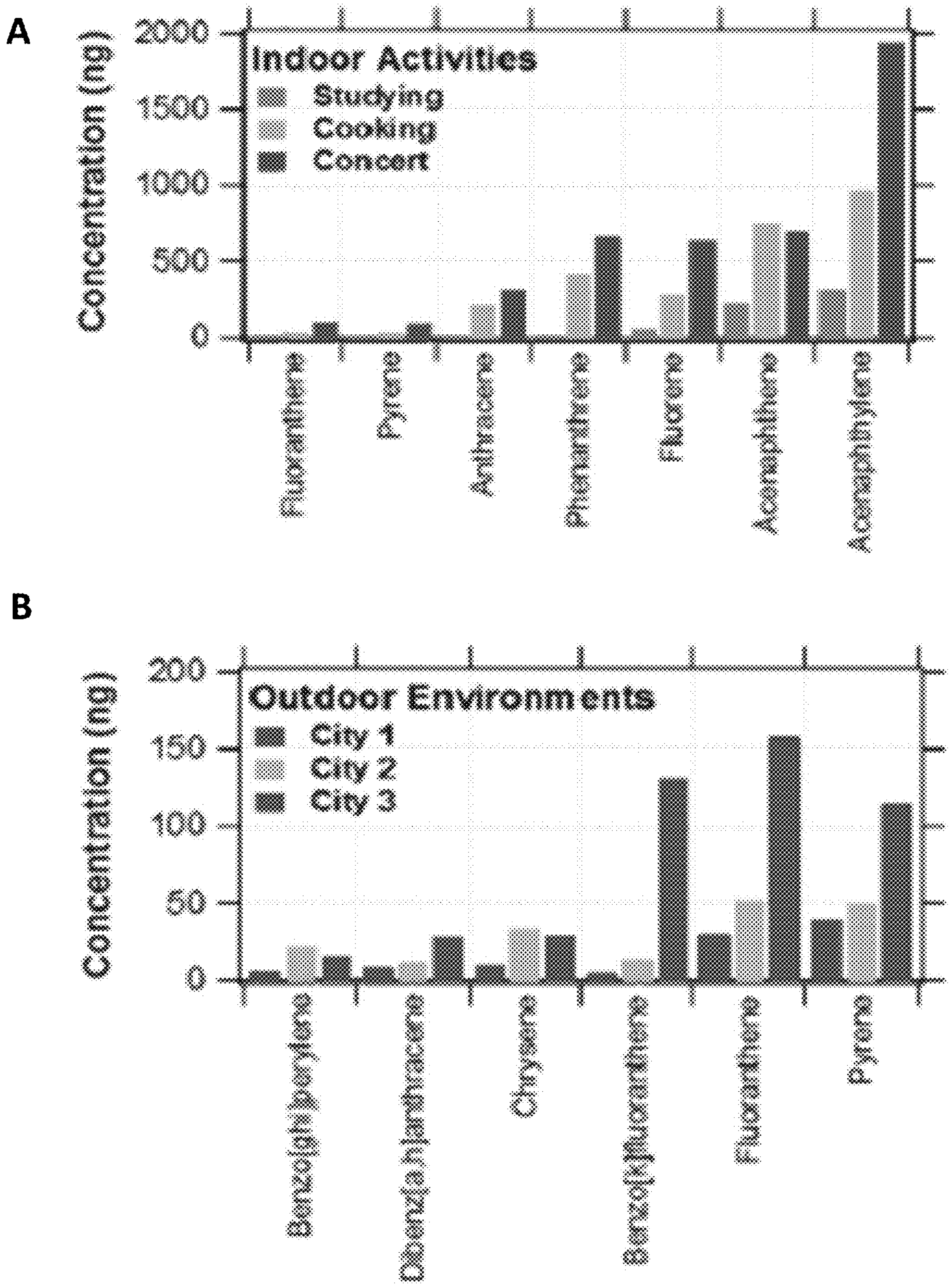
FIG. 10 depict the percent difference in PAH recovery from PDMS sorbent bars at 24 hours at 23° C. in order of increasing molecular weight.

As the Fresh Air wristband was designed to be worn over multi-day exposure periods, it was of interest to evaluate the stability of absorbed compounds in the PDMS sorbent bar. PDMS sorbent bars in the Fresh Air wristband were infused with deuterated internal standards and kept at 23° C. or 4° C. for 24 hours. Lower molecular weight compounds (<180 g/mol) experienced losses following 24 hours at 23° C. compared to 4° C.; (FIG. 10) losses for these lighter compounds were proportional to molecular weight ($R^2$=0.905). Retention of higher molecular weights (>180 g/mol) in the PDMS sorbent bar were not influenced by temperature.

Application of the Fresh Air Wristband as a Personal Exposure Tool

Figure 7:
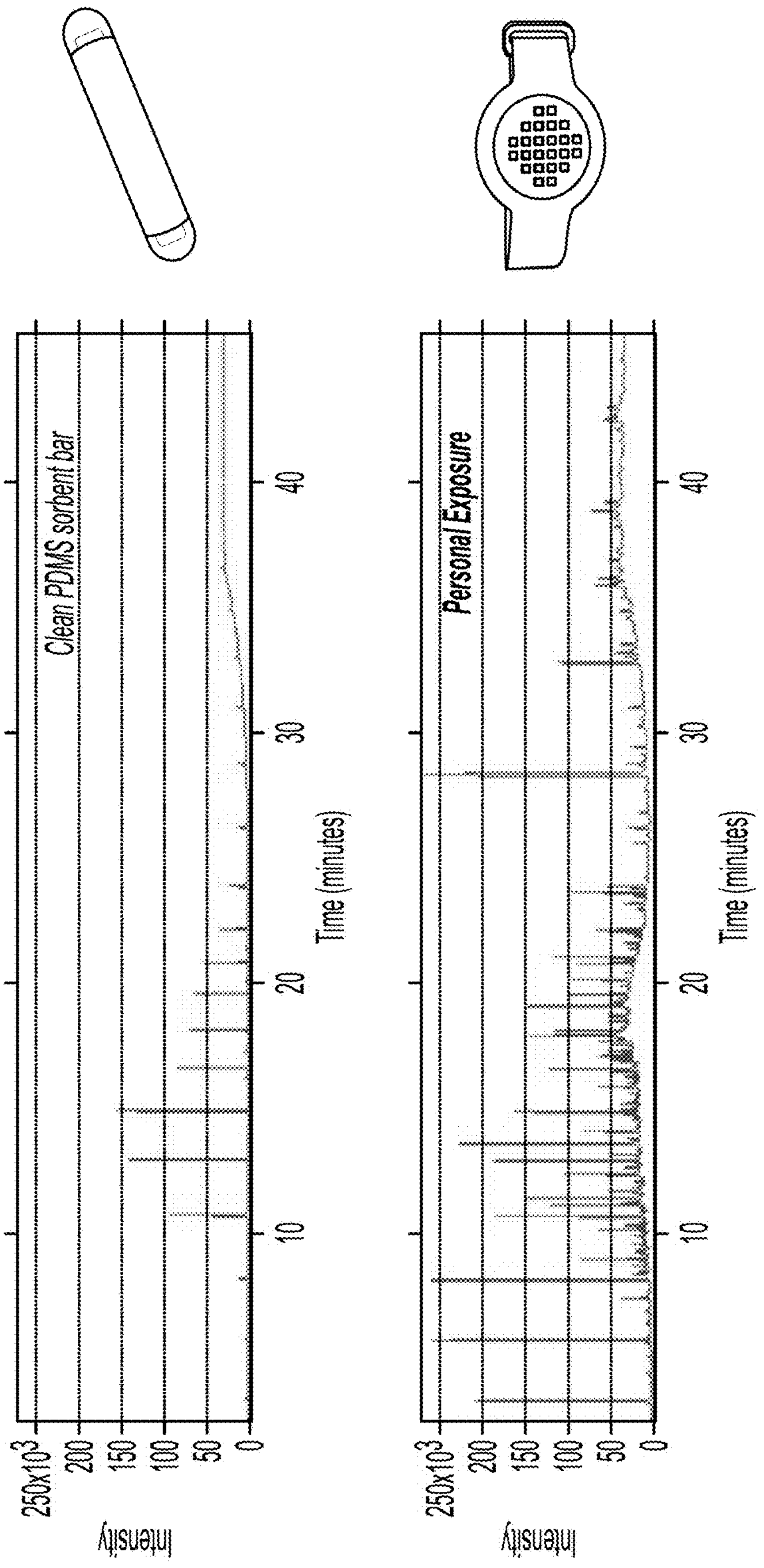
FIG. 7 depicts a chromatogram for a clean sorbent bar and a sorbent bar after personal exposure.

The Fresh Air wristband was demonstrated as a personal exposure tool with school-aged children. Children reported this exposure assessment tool could be worn during all daily activities and was only removed while bathing or swimming. Atmospheric concentrations were reported for $NO_2$ using a commercially-available passive sampler while exposure VOCs and PAHs levels were reported as mass uptake on the PDMS sorbent bar. A comparison of a clean PDMS sorbent bar and one that was worn by in the Fresh Air wristband is shown in FIG. 7. The reported mass loading of lower molecular weight compounds likely reflected exposures levels over the past 24 hours rather than cumulative exposure of the multi-day assessment period given the limited retention in the PDMS sorbent bar.

Figure 11:
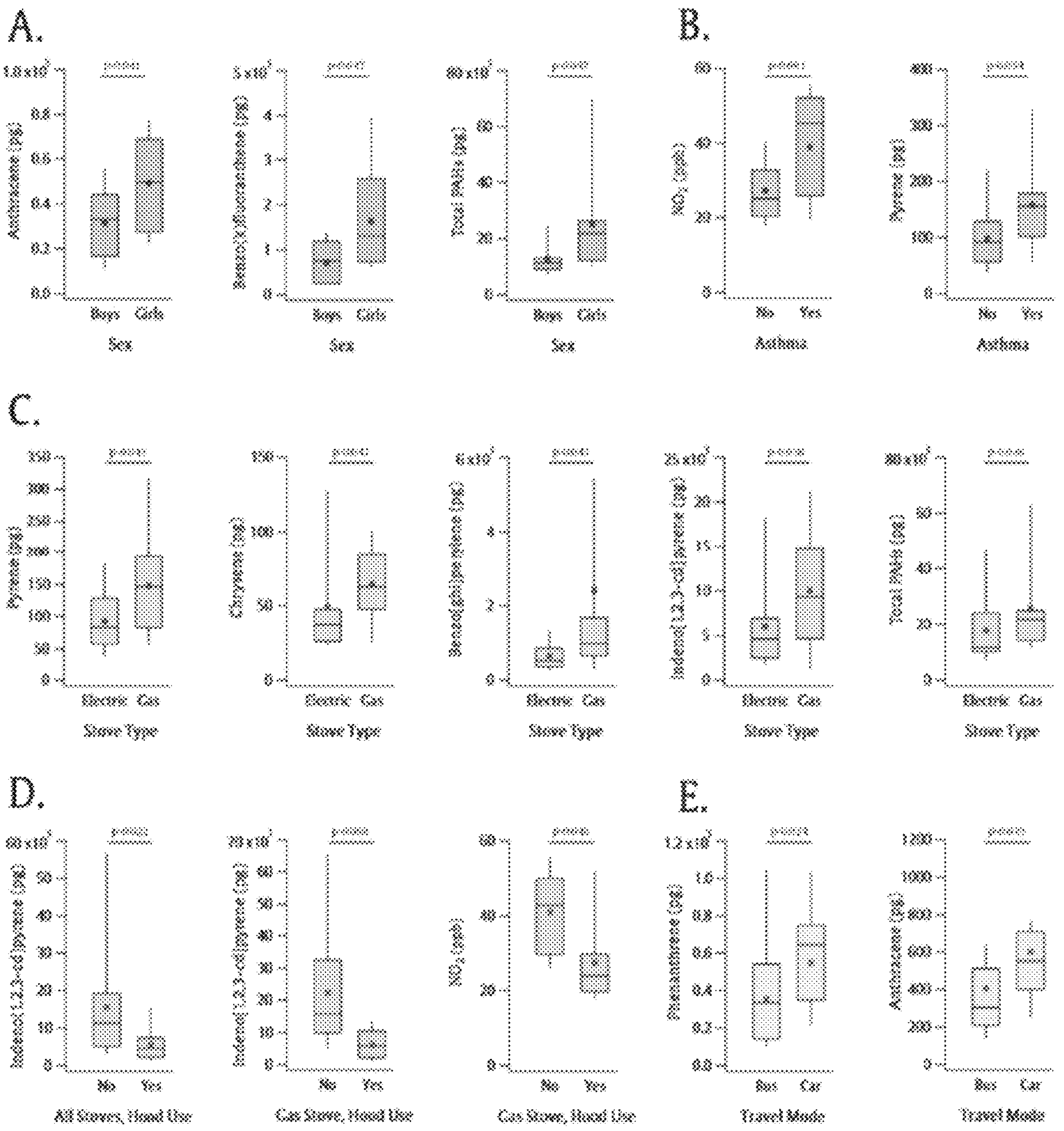
FIG. 11 depicts graphs of personal air pollutant exposure of captured by a wearable pollutant monitoring device according to embodiments of the present disclosure. Exposures are compared by asthma status, home characteristics, and home-to-school mode of travel.

Girls were found to have elevated exposure concentrations of anthracene (p=0.046) and benzo[k]fluoranthene (p=0.044); no difference was found for other test compounds. Children with physician diagnosed asthma were found to have elevated personal exposure concentrations of $NO_2$ (p=0.018), pyrene (p=0.049), and phenanthrene (p=0.039) compared to children with no reported asthma diagnosis (FIG. 11). A trend towards increased levels of acenaphthylene, benzo(ghi)perylene, and acenaphthene was also observed for children with asthma. There is strong evidence supporting the association between air pollution, primarily evaluated as $NO_2$, ozone, or PM mass concentration, and asthma development as well as asthma morbidity in children. Specific PM components with pro-oxidant capabilities (i.e. VOCs, PAHs) can induce oxidative stress and contribute to the pathogenesis and/or exacerbation of asthma. Studies have evaluated PAH exposure in relationship to asthma outcomes, most have used stationary samplers placed at the child's home or assessed PAH metabolites in urine. The Fresno Asthmatic Children's Environment Study also assessed PAH exposure of asthmatic children (6-11 years, n=83). Rather than personal monitoring, stationary samplers positioned outside the child's house. Across all PAH measured, phenanthrene was found to have the greatly impact on wheeze. Another study investigating urinary PAH metabolites of children (6-19 years, n=15,447) further found 1-pyrene was positively associated with diagnosed asthma. Increased levels of 2-phenanthrene and 4-phenanthrene were further reported to be related diagnosed asthma in boys and wheeze among girls, respectively. In another study, children with non-atopic asthma (5-6 years, n=242) that were enrolled in the Columbia Center for Children's Environmental Health cohort wore an air sampling apparatus (filter and polyurethane foam cartridges and a pump) for 48 hours to measure personal PAH exposure. Elevated pyrene exposure was found to be positively associated with asthma diagnosis; non-volatile PAHs were not found to be associated with any of the tested outcomes. Few other studies have directly measured personal exposure to PAH in relationship with asthma outcomes due to challenges with exposure assessment. Results from the current study demonstrate the utility of the Fresh Air wristband as a wearable air pollutant sampler for exposure assessment of in pediatric populations.

Exposure to emissions from traffic and cooking, specifically gas stoves, have been associated with asthma outcomes in children. Thus, personal exposure concentrations measured in the current study were compared for children for different home characteristics or school commutes. Children living in houses with gas stoves were found to have increased levels of pyrene (p=0.041) and benz[a]anthracene (p=0.022) compared to electric stoves. A trend towards increased levels of naphthalene, benzo[k]fluoranthene, indeno[1,2,3-cd]pyrene and benzo[ghi]perylene was also observed for houses with gas stoves. In houses which reported use of the stove ventilation hood (duct or ductless design), decreased personal $NO_2$ exposure concentrations for cases where a ventilation hood (27.2 ppb) was used compared to households which did not used the vent (44.0 ppb, p=0.015) (FIG. 38). Ventilation hood use also decreased personal exposure concentrations of benzo(k) fluoranthene in households with electric stoves (p=0.037). Different modes of commuting were further associated with different exposure concentration: car commuters exhibited increased 1,1,2,3,4,4-hexachlorobutadiene personal exposure levels compared to travel by bus/walking (p=0.013). A trend towards elevated phenanthrene and anthracene was also observed for children travelling by car. In contrast, bus commuters had higher levels of 1-bromo-4-phenoxybenzene compared to children who were driven to school by car (p=0.010). The duration of the daily round-trip commute, specifically by car, was positively associated with fluorene (p=0.050) and benzo(b)fluoranthene (p=0.058) (FIG. 38). While PAHs were not specifically considered, surrogate/related measurements were evaluated, including particulate matter mass concentration, particle number concentration, black carbon, and carbon monoxide.

CONCLUSIONS

Characterizing cumulative personal exposure to air pollutant mixtures is a critical step in understanding disease development. The Fresh Air wristband was developed with the objective of addressing this research challenge. This wristband was shown to passively sample $NO_2$ with an Ogawa pad as well as VOCs and PAHs using a thin-filmed PDMS sorbent bar. Both sampling substrate were analyzed using off-line spectrometric and MS analyses, respectively. While the $NO_2$ measurements using Ogawa pads have been well described in the literature, this is the first study to evaluate airborne VOC and PAH sampling by a PDMS sorbent bar mounted in a wearable device. Linear uptake and good repeatability was found for all tested compounds but only higher molecular weight analyses (>180 g/mol) were well retained in the PDMS over extended sampling/storage periods (>24 hours) at room temperature. The utility of the Fresh Air wristband as a personal exposure assessment tool was demonstrated in school-aged children. PAH concentrations were found to differ across asthma status, home kitchen characteristics, and mode of travel to school. Use of this air pollutant monitoring approach in prospective epidemiological studies has the potential to provide insight into an individual's unique pollutant profiles. The low cost of this sampling technique will further enable deployment across large populations, increasing the quantity of environmental data available for evaluating environmental risk factors for disease.

EQUIVALENTS

Although non-limiting embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

What is claimed is:

1. A device for capturing chemical and biological compounds, comprising:
- at least one sorbent rod, comprising:
  - a glass tube having a predefined length and a predefined diameter, and
  - a sorbent material coating at least a portion of a surface of the glass tube; and
- a housing chamber defining an inner cavity,
  - wherein the at least one sorbent rod is positioned within the housing chamber,
- wherein an inner diameter of the glass tube defines an inner cavity running the predefined length of the glass tube,
- wherein the device further comprises a metallic wire having a length greater than the length of the glass tube and a diameter smaller than the inner diameter of the glass tube,
- wherein the metallic wire is positioned within the inner cavity of the glass tube such that a first end and a second end of the metallic wire are positioned external to the inner cavity of the glass tube, and
- wherein the first end and the second end of the metallic wire are coupled to an inner surface of the housing chamber via a magnet, thereby positioning the sorbent rod within the housing chamber.

2. The device of claim 1, wherein a surface of the housing chamber further defines one or more apertures.

3. The device of claim 1, further comprising a wearable defining a chamber cavity, depression, or surface for positioning the housing chamber.

4. The device of claim 3, wherein the wearable further comprises a strap or a clip.

5. A method of extracting sorbed compounds by the sorbent rod of claim 1, the method comprising:
- removing the sorbent rod from the housing chamber; and
- exposing the sorbent rod to a thermal desorption process, comprising:
  - inserting the sorbent rod into an autosampler tube; and
  - heating the autosampler tube to 280° C. under a helium gas flow.

6. A method of extracting sorbed compounds captured by the sorbent rod of claim 1, the method comprising:

removing the sorbent rod from the housing chamber; and exposing the sorbent rod to a solvent or buffer extraction process, comprising:

immersing the sorbent rod into a buffer or solvent solution comprising methanol, dichloromethane, hexane, toluene, or a combination thereof.

7. The device of claim 1, wherein at least one of the following applies:

(a) the sorbent material is coated on an outer surface of the glass tube;

(b) the sorbent material comprises polydimethylsiloxane (PDMS).

* * * * *